F. HAHN.
TRACTION WHEEL.
APPLICATION FILED SEPT. 10, 1909.
960,541.
Patented June 7, 1910.
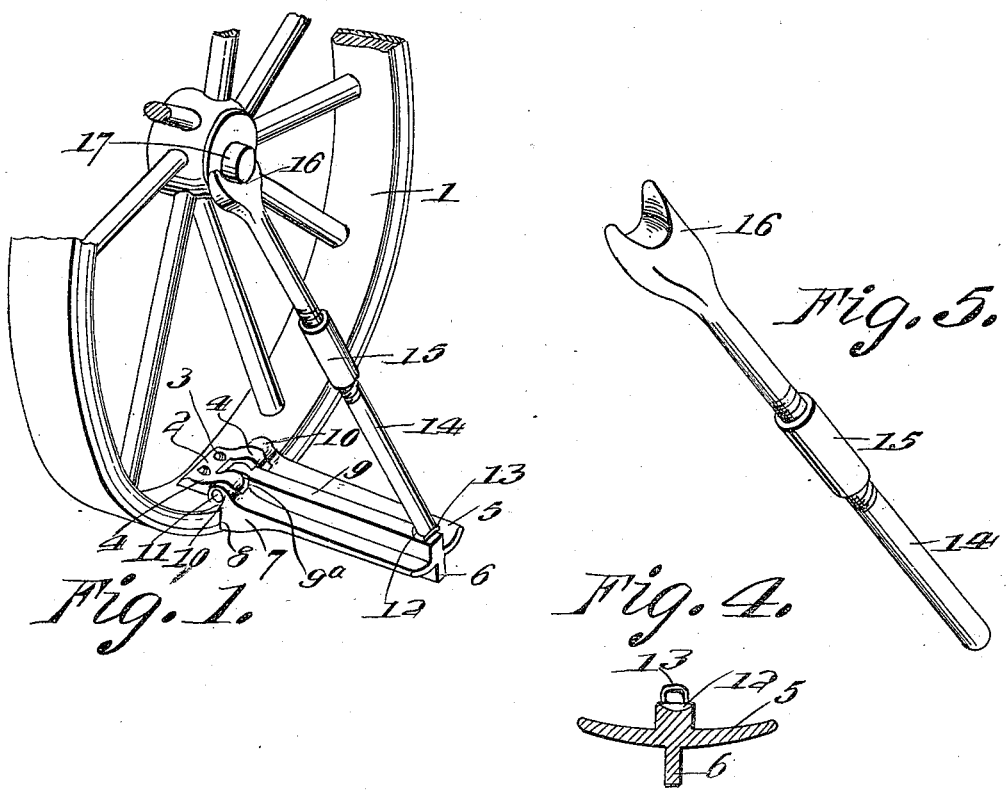
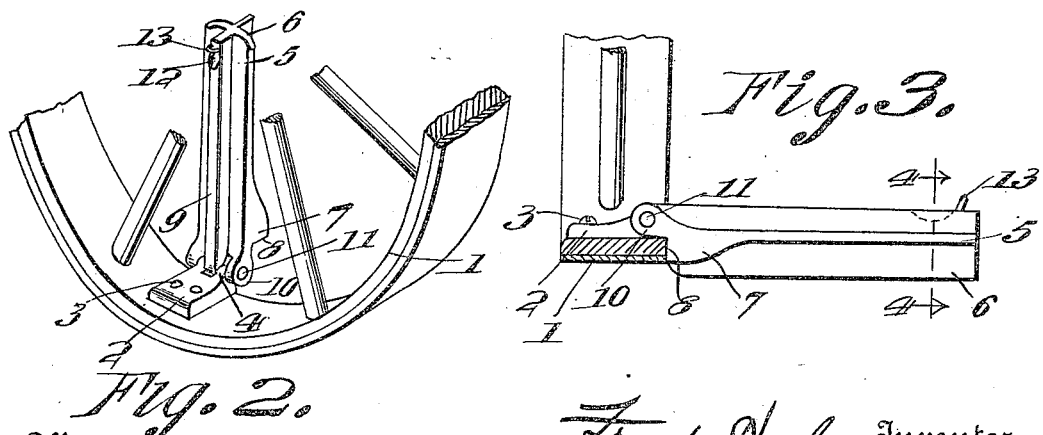
Witnesses
M. E. Connor
Edward P. Pitman
Frank Hahn, Inventor
By Samuel Hirsch, Attorney

UNITED STATES PATENT OFFICE.

FRANK HAHN, OF DOLAND, SOUTH DAKOTA.

TRACTION-WHEEL.

960,541.  Specification of Letters Patent.  Patented June 7, 1910.

Application filed September 10, 1909.  Serial No. 517,167.

*To all whom it may concern:*

Be it known that I, FRANK HAHN, a citizen of the United States, residing at Doland, in the county of Spink and State of South Dakota, have invented certain new and useful Improvements in Traction-Wheels, of which the following is a specification.

This invention relates to certain new and useful improvements in traction engine wheels and relates more particularly to a mud-leg, or road gripping attachment which is used in cases where the road does not offer a good grip for the traction wheel, or, in cases where the road gripping properties of the wheels are desired to be increased.

Further the invention aims to simplify wheels of this type, generally improve the construction and increase the durability and efficiency.

In the drawings, Figure 1, is a fragmentary perspective view showing a wheel equipped in a manner contemplated by the present case, Fig. 2, is a similar view showing the attachment in folded or inoperative position, Fig. 3, is a cross section of the wheel showing the invention in side elevation, Fig. 4, is a section on line 4—4 of Fig. 3, and Fig. 5, is a perspective view of the brace-rod.

The traction wheel to which the invention is applied is designated 1, and has secured to the inner face of the rim thereof a hinge member 2 formed of a plate which is secured to the rim by means of screws or bolts 3, and has formed integral therewith a pair of spaced outwardly extending lugs 4, which latter are perforated for a purpose shortly referred to. The attachment proper includes a plate 5 formed on its under side with a longitudinal road gripping member 6. The plate 5 is also formed on its under face adjacent its inner end with a pair of enlargements 7 which are cast integral with the plate 5 and abut the member 6. The inner ends 8 of enlargements 7 abut the outer side face of the rim 1 and receive support therefrom. A longitudinal rib 9 is cast integral with the top face of plate 5 and has its inner end 9ª, extended beyond the inner end of the body or major portion of plate 5 and is perforated. Located in spaced relation to the inner end of rib 9, are a pair of inwardly extending perforated ears 10, so disposed as to receive the lugs 4, betwen themselves, the perforated end 9ª of rib 9 being received in the space between lugs 4. A pin 11, is passed through the alining perforations of lugs 4, end 9ª of rib 9, and ears 10, thereby forming a hinged or pivotal connection between the parts just mentioned. Rib 9 on its upper face adjacent its outer or free end is formed with a concave seat 12, adjacent the outer end of which is a staple-shaped member 13, which forms a shoulder or abutment for one end of brace-rod 14, which engages in seat 12, as clearly depicted in Fig. 1. Brace-rod 14, is provided with a turnbuckle 15, whereby it may be adjusted as desired. The opposite end of brace-rod 14, is of forked shape to engage a pin or projecting hub. Preferably plate 5, is formed of a pair of oppositely disposed members each of concave-convex contour in cross section. The gripping member 6, projects below the tread of the wheel tire as seen in Fig. 3. By rotation of turnbuckle 15, the brace-rod 14, may have its length extended to firmly hold the road gripping member 6, in operative position, and by reverse rotation of the turnbuckle, the length of the rod may be decreased to allow member 6 to move to folded position.

What I claim as new and desire to secure by Letters Patent is:—

1. In a traction wheel, a road gripping member, means for hinging said member to the inner side of the wheel rim, and adjustable means engaging the outer free end of said member and at its inner end seating directly on the wheel hub to sustain said member in operative position.

2. In a traction wheel, a part rigidly secured to the inner circumference of the wheel rim and being provided with perforated elements in spaced relation, a road gripping member also having spaced perforated elements which engage between the first named elements, a pin passing through said perforations of said elements whereby to hingedly connect said part and member, ribs formed on the top and bottom faces of said member, one of said ribs being formed with a concave seat and an abutment at the outer side of the seat, and a brace rod having one end to engage in said seat and with said abutment, having its opposite end forked to engage with the wheel hub, and means whereby said rod may be adjusted longitudinally.

3. In a traction wheel, a road engaging member formed with an inner shoulder adapted to engage with one of the side faces of the wheel rim, means to pivotally relate said member to the wheel rim, and means disposed between the wheel hub and said member to hold the latter in operative position.

4. In a traction wheel, a road engaging member, means for pivoting said member to the wheel rim, and an adjustable rod removably disposed between the wheel and the outer end of said member to hold the latter in operative position, said rod being adjustable to increase its length after being placed in operative position.

5. In a traction wheel, a road engaging member pivoted to the wheel rim, said member being formed with longitudinal ribs on its top and bottom faces, a pair of shoulders at the inner end of the member adapted when the member is in operative position to abut the side of the wheel rim, and a turnbuckle provided rod engaging between the outer end of the member and the wheel hub.

6. In a traction wheel, a road engaging member pivoted to the wheel so as to be capable of being folded to lie parallel with the wheel spokes, and means to hold said member in extended position, said means being capable of having its length decreased for allowing the member to move to folded position.

7. In a traction wheel, a road engaging member pivoted to the wheel at the rim thereof, and means capable of having its length increased to hold said member in extended position, said means being diagonally related to said member and engaging with the wheel at the inner side of the rim thereof.

In testimony whereof I affix my signature, in presence of two witnesses.

FRANK HAHN.

Witnesses:
  Jos. Hahn,
  C. H. Drayer.